United States Patent [19]

Kobayashi et al.

[11] Patent Number: 5,145,934
[45] Date of Patent: Sep. 8, 1992

[54] METHOD FOR NEUTRALIZING ACIDS IN ORGANOPOLYSILOXANES

[75] Inventors: Kazuo Kobayashi; Yokichi Yamamoto, both of Chiba, Japan

[73] Assignee: Dow Corning Toray Silicone Company, Tokyo, Japan

[21] Appl. No.: 613,029

[22] Filed: Nov. 15, 1990

[30] Foreign Application Priority Data

Nov. 30, 1989 [JP] Japan .................... 1-311012

[51] Int. Cl.$^5$ ............................. C08G 77/06
[52] U.S. Cl. ....................... 528/23; 528/18; 528/21; 528/31; 556/467
[58] Field of Search ............ 528/23, 21, 18, 31; 556/467

[56] References Cited

U.S. PATENT DOCUMENTS 4,722,987 2/1988 Ikeno et al. .................. 528/23
4,960,850 10/1990 Billet et al. .................. 528/23

FOREIGN PATENT DOCUMENTS 62-41228 2/1987 Japan .

Primary Examiner—Melvyn I. Marquis
Attorney, Agent, or Firm—Robert L. McKellar

[57] ABSTRACT

The present invention relates to a method of neutralizing acids in organopolysiloxanes. The method comprises adding certain ammonium compounds to the organopolysiloxanes and heating to the decomposition temperature of the ammonium compound to neutralize any acids present in the organopolysiloxanes.

2 Claims, No Drawings

METHOD FOR NEUTRALIZING ACIDS IN ORGANOPOLYSILOXANES

BACKGROUND OF THE INVENTION

The present invention relates to a method for neutralizing acids in in organopolysiloxanes by adding certain ammonium compounds to the organopolysiloxanes and then heating the organopolysiloxanes to the decomposition temperature of the ammonium compound.

PRIOR ART it is well known that organosiloxanes may be polymerized in the presence of a strong acid catalyst or strong base catalyst. However, there are restrictions on the use of strong base catalyst since they cause partial cleavage of the silicon-hydrogen bond or silicon-carbon bond during organosiloxane polymerization. As a consequence, strong acid catalysts are generally used for organosiloxane polymerization. Organopolysiloxanes may be prepared using a strong acid catalyst by the polymerization of organosiloxane in the presence of a strong acid catalyst (e.g., sulfuric acid, nitric acid, trifluoromethanesulfonic acid, silyl esters of trifluoromethanesulfonic acid, and so forth), followed by a water wash and ten neutralization of the stron acid catalyst by the addition of a neutralizing agent in the form of a basic substance such as magnesium oxide, sodium carbonate, calcium carbonate, ammonium carbonate, ammonium bicarbonate, etc. In addition, neutralization of the strong acid catalyst by water and a silazane compound is disclosed in Japanese Patent Application Laid Open number 62-41228 (41,228/87).

THE INVENTION

In the prior art approach described above, the bases used for neutralization are solids in all cases and this lengthens the amount of time required for enturalization. Moreover, neutralization is not complete. As a consequence, the resulting organopolysiloxanes contain residues of the strong acid catalyst, which causes such problems as a reduction in that resistance, and so forth. In the latter approach, cleaveage of the silicon-hydrogen bond is prone to occur due to the aqueous ammonia produced by hydrolysis of the silazane compound. In fact, the problem of partial gelation occurs in the particular case of the preparation of SiH-containing organohydrogenpolysiloxane.

The inventors herein achieved the present invention as the result of extensive research directed at solving the aforementioned problems.

With regard to methods for the preparation of organopolysiloxanes, the present invention takes as its object the introduction of a method for the neutralization of organopolysiloxanes which provides for a highly efficient and almost complete neutralization of the strong acid catalyst after the polymerization of organosiloxane in the presence of a strong acid catalyst.

The present invention relates to a method for the neutralization of organopolysiloxanes containing strong acids, said strong acids being neutralized by the addition of ammonium carbonate or ammonium bicarbonate to the system and heating to at least said ammonium's decomposition temperature.

The method of preparation to the organopolysiloxanes is not critical in this invention, but rather encompasses typical methods to the polymerization of organosiloxane such as, for example, the addition of a strong acid catalyst to cyclic and/or linear low-molecular-weight siloxane and polymerization with heating. Moreover, molecular chain end-blocking agents such as hexamethyldisiloxane or tetramethyldivinyldisiloxane may be added to the polymerization system in order to achieve a particular desired degree of polymerization for the oerganopolysiloxane.

The strong acid catalyst used here are those already known in the art. In particular, trifluoromethane-sulfonic acid and the silyl users of trifluoromethane-sulfonic acid are preferred because their high reaction activity makes it possible to use them at concentrations lower than for other strong acid catalysts.

The present invention comprises the neutralization of this strong acid catalyst by the addition of certain ammonium compounds, namely, ammonium carbonate or ammonium bicarbonate to the reaction system composed of organopoly-siloxanes polymerized in the presence of such a strong acid catalyst, and by heating to at least the decomposition temperature of the ammonium compound. The ammonium carbonate or ammonium bicarbonate used here may stake the form of the usual commercial products, and the purity and crystalline structure are not critical. As far as the neutralization temperatures are concerned, for ammonium carbonate the decomposition temperature must be at least 58 degrees Centigrade while or ammonium bicarbonate the decomposition temperature must be at least 60 degree Centigrade. These should be employed in a quantity sufficient to neutralize the strong acid catalyst used, and are generally used within the range of 1 to 10 equivalents per 1 equivalent of strong acid catalyst.

The preparation method to the present invention is particularly useful as a method for the preparation of SiH-containing organohydrogenpolysiloxane. Moreover, the preparative method of the present invention affords organopolysiloxane with an excellent that resistance due to the almost complete absence of residual strong acid catalyst.

EXAMPLES

The present invention will be explained in greater detail below with reference to illustrative examples. In the examples, neutralization of the strong acid catalyst was confirmed by measurement to the acid value according to the measurement method stipulated in JIS K 3504. Furthermore, the viscosity is the value measured at 25 degrees Centigrade, and cs is centistrokes.

EXAMPLE 1

922 Grams octamethylcyclotetrasiloxane and 78 g hexamethyldisiloxane were introduced into a glass reactor and heated to 70 degrees Centigrade with stirring. then, while continuing to stir, 1 g trifluoromethanesulfonic acid was added, and a polymerization reaction was run by continuing to stir under the same conditions. After the viscosity of the reaction mass had reached equilibrium, 1.3 g ammonium bicarbonate (decomposition temperature=60 degrees Centigrade) was introduced followed by heating for 1 hour at 80 degrees Centigrade with stirring. The low-boiling components were then removed by heating to 180 degrees Centigrade under a vacuum of 20 mmHg. After cooling, the produced ammonium trifluoromethanesulfonate was removed by filtration. The resulting dimethylpolysiloxane was transparent. For comparison, organopolysiloxane was prepared by proceeding in the same manner as above, but adding one of the various bases reported in Table 1 instead of ammonium bicarbonate. The yield, acid value, and viscosity were measured on the obtained dimethylpolysiloxanes, and these results are reported in Table 1.

TABLE 1

| Neut. agent | Present Invention | | Comparison Examples | |
|---|---|---|---|---|
| | $NH_4HCO_3$ | $NaHCO_3$ | $CaCO_3$ | $CH_3COONa$ |
| Yield, % | 86 | 86 | 86 | 86 |
| Acid value | 0.004 | 0.024 | 0.036 | 0.022 |
| Viscosity (cs) | 1010 | 1000 | 990 | 1010 |

EXAMPLE 2

Dimethylpolysiloxane was prepared as in Example 1 using ammonium carbonate ($(NH_4)_2CO_3.H_2O$, decomposition temperature is 58 degrees Centigrade) in place to the ammonium bicarbonate used in Example 1. The yield, acid value, and viscosity were measured on this dimehtylpoly-siloxane, again proceeding as in example 1, and the following values were obtained: yeild = 86%, acid value = 0.0004, and viscosity = 1,000 cs.

EXAMPLE 3

The following were introduced into a glass reactor and heated to 709 degrees Centigrade: 907 g octamethylcyclotetrasiloxane, 51 g trimethylsiloxy-terminated methylhydrogenpolysiloxane, and 22 g hexametyldisiloxane. Then, while heating and stiring, 1 g trimethylsily ester of trifluoromethanesulfonic acid was added, and a polymerization reaction was run with stirring. The reaction reached equilibrium after 7 hours, at which point 1.3 g ammonium carbonate (($NH_{r4})_2CO_3.H_2O$, decomposition temperature = 58 degrees Centigrade) was added. This was followed by heating at 80 degrees Centigrade for 1 hour with stirring, then removal of low-boiling components under a vacuum of 10 mmHg. After cooling, the produced ammonium trifluoromethanesulfonate was removed by filtration to afford a transparent dimethylsiloxane-methylhydrogensiloxane copolymer.

For comparison, dimethylsiloxane-methylhtydrogensiloxane copolymer was obtained as in Example 3, but using a neutralization temperature of 25 degrees Centigrade. The yield, viscosity, and acid value of these dimethylsiloxane-methylhydrogensiloxane copolymers were measured as in Example 1, and the obtained values are reported in Table 2.

TABLE 2

| | Present Invention | Comparison Example |
|---|---|---|
| Yield, % | 95 | 98 |
| Acid value | 0.0004 | 0.020 |
| Viscosity (cs) | 108 | 106 |

Because the present invention's method for the neutralization of organopolysiloxane comprises neutralization of the strong acids in the organopolysiloxanes by the addition of ammonium carbonate or ammonium bicarbonate and heating to at least the decomposition temperature of the ammonium compound, this method is characterized by the highly efficient neutralization to the strong acid and by the almost total neutralization to the strong acid catalyst.

That which is claimed:

1. A method for neutralizing strong acids in an organopolysiloxane, the method comprising addition an ammonium compound selected form the group consisting essentially of (i) ammonium carbonate and,
   (ii) ammonium bicarbonate to the organopolysiloxane and heating the organopolysiloxane to at least the decomposition temperature of the ammonium compound.

2. A method as claimed in claim 1 wherein the organopolysiloxane is a methylhydrogenpolysiloxane.

* * * * *